(12) United States Patent
Mizutani et al.

(10) Patent No.: US 8,218,161 B2
(45) Date of Patent: Jul. 10, 2012

(54) IMAGE FORMING APPARATUS

(75) Inventors: Norio Mizutani, Mie-ken (JP); Kousuke Fukaya, Chiryu (JP); Naoki Hashimoto, Nagoya (JP); Shigetaka Yoshida, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1020 days.

(21) Appl. No.: 12/178,916

(22) Filed: Jul. 24, 2008

(65) Prior Publication Data

US 2009/0027711 A1 Jan. 29, 2009

(30) Foreign Application Priority Data

Jul. 26, 2007 (JP) ................................. 2007-194399

(51) Int. Cl.
*G06F 3/12* (2006.01)
(52) U.S. Cl. ..................... 358/1.13; 358/1.12; 358/1.15; 358/1.18
(58) Field of Classification Search .................. None
See application file for complete search history.

(56) References Cited

U.S. PATENT DOCUMENTS

| | | | | |
|---|---|---|---|---|
| 6,369,906 | B1* | 4/2002 | Nakao ........................ | 358/1.15 |
| 6,724,492 | B1* | 4/2004 | Iwase et al. ................ | 358/1.13 |
| 6,883,888 | B2* | 4/2005 | Kubo ........................... | 347/5 |
| 6,975,421 | B1 | 12/2005 | Hashimoto et al. | |
| 7,456,980 | B2* | 11/2008 | Kuboki ........................ | 358/1.13 |
| 7,802,187 | B2* | 9/2010 | Yoshida ...................... | 715/710 |
| 2004/0027602 | A1 | 2/2004 | Kuboki | |
| 2004/0246504 | A1 | 12/2004 | Mitsubori | |
| 2005/0052679 | A1* | 3/2005 | Green et al. ................ | 358/1.14 |
| 2006/0050313 | A1 | 3/2006 | Hashimoto et al. | |
| 2007/0146737 | A1* | 6/2007 | Morimoto .................... | 358/1.2 |
| 2009/0059292 | A1 | 3/2009 | Kuboki | |

FOREIGN PATENT DOCUMENTS

| | | |
|---|---|---|
| EP | 1686457 A2 | 8/2006 |
| JP | H04-335366 A | 11/1992 |
| JP | 7-299936 | 11/1995 |
| JP | 8-248831 | 9/1996 |
| JP | 10-291356 | 11/1998 |
| JP | H11-091216 A | 4/1999 |
| JP | 2000-263901 A | 9/2000 |
| JP | 2001-80142 | 3/2001 |
| JP | 2001-277672 A | 10/2001 |

(Continued)

OTHER PUBLICATIONS

Japan Patent Office; Notice of Reasons for Rejection in Japanese Patent Application No. 2009-230228 (counterpart to the above-captioned US Patent Application) mailed on Aug. 3, 2010.

(Continued)

*Primary Examiner* — Chan Park
(74) *Attorney, Agent, or Firm* — Baker Botts L.L.P.

(57) ABSTRACT

An image forming apparatus includes: a selection section which selects a print target to be printed; an input section which inputs a print job for printing the print target selected by the selection section; an instruction section which instructs to continue the print job; and a printing section which executes a trial printing of printing a part of the print job including a plurality of pages input by the input section as a trial page, and thereafter, restarting and finishing the print job in response to that the instruction section instructs to continue the print job.

16 Claims, 9 Drawing Sheets

INTERRUPTED FILE MANAGEMENT TABLE

| FILE NAME | PRINTING CONDITION | NUMBER OF PRINTED PAGES |
|---|---|---|
| FILE a | A4 PORTRAIT, 2 IN 1, DOUBLE-SIDED | 5, 6, 7, 8 |
| FILE b | A4 PORTRAIT, 1 IN 1, SINGLE-SIDED (DEFAULT) | 3 |
| | | |

FOREIGN PATENT DOCUMENTS

| | | |
|---|---|---|
| JP | 2003-266899 A | 9/2003 |
| JP | 2004-032704 A | 1/2004 |
| JP | 2004-358911 A | 12/2004 |
| JP | 2006-35533 | 2/2006 |
| JP | 2006-168206 | 6/2006 |
| JP | 2007-028105 A | 2/2007 |

OTHER PUBLICATIONS

European Patent Office; European Search Report in European Patent Application No. 08252483.6 (counterpart to the above-captioned US Patent Application) mailed on Aug. 4, 2010.

Japan Patent Office, Notification of Reasons for Refusal in counterpart Patent Application No. JP 2007-194399 mailed Aug. 11, 2009.

* cited by examiner

INTERRUPTED FILE MANAGEMENT TABLE

| FILE NAME | PRINTING CONDITION | NUMBER OF PRINTED PAGES |
|---|---|---|
| FILE a | A4 PORTRAIT, 2 IN 1, DOUBLE-SIDED | 5, 6, 7, 8 |
| FILE b | A4 PORTRAIT, 1 IN 1, SINGLE-SIDED (DEFAULT) | 3 |
| | | |

IMAGE FORMING APPARATUS

CROSS-REFERENCE TO RELATED APPLICATION

This application claims priority from Japanese Patent Application No. 2007-194399, filed on Jul. 26, 2007, the entire subject matter of which is incorporated herein by reference.

TECHNICAL FIELD

Aspects of the present invention relate to an image forming apparatus and, more particularly, to an image forming apparatus which has a function to print an electronic file stored in a removable medium or other storage medium.

BACKGROUND

In recent years, a printer has been developed which has a function to print an electronic file stored in a removable medium without using an information terminal such as a computer (PC) or the like. Such a printer is configured such that a removable medium is mounted thereon, to thereby simply print an electronic file stored in the removable medium. Examples of the electronic file to be printed include bitmap image files created by a digital still camera and document files such as a PDF file and the like created on the PC.

In such a printer, a user may select an electronic file to be printed or sets a printing condition by means of various buttons, while confirming the contents of the electronic file or the printing condition on a display provided in an operating panel (for example, see JP-A-2006-168206).

However, a user interface such as a display or buttons mounted on a printer is tend to be poor due to cost and the like as compared with a user interface mounted on a PC or the like. For this reason, the user may not sufficiently confirm the contents of the electronic file. Therefore, the user may erroneously select an electronic file to be printed or may erroneously set the printing condition, and as a result, an unintended printed matter may be output. In particular, if an electronic file including a plurality of pages such as a document file or the like or multiple copies are printed, the above-described misprinting causes large amount of ink or sheet consumption, and thus a large loss may be incurred.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide an image forming apparatus which can suppress ink or sheet consumption due to misprinting.

According to an exemplary embodiment of the present invention, there is provided an image forming apparatus including: a selection section which selects a print target to be printed; an input section which inputs a print job for printing the print target selected by the selection section; an instruction section which instructs to continue the print job; and a printing section which executes a trial printing of printing a part of the print job including a plurality of pages input by the input section as a trial page, and thereafter, restarting and finishing the print job in response to that the instruction section instructs to continue the print job.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

Exemplary embodiments of the present invention will be described with reference to FIG. 1 to FIG. 10.

(Exterior Configuration of Multi Function Device)

Figure 1:
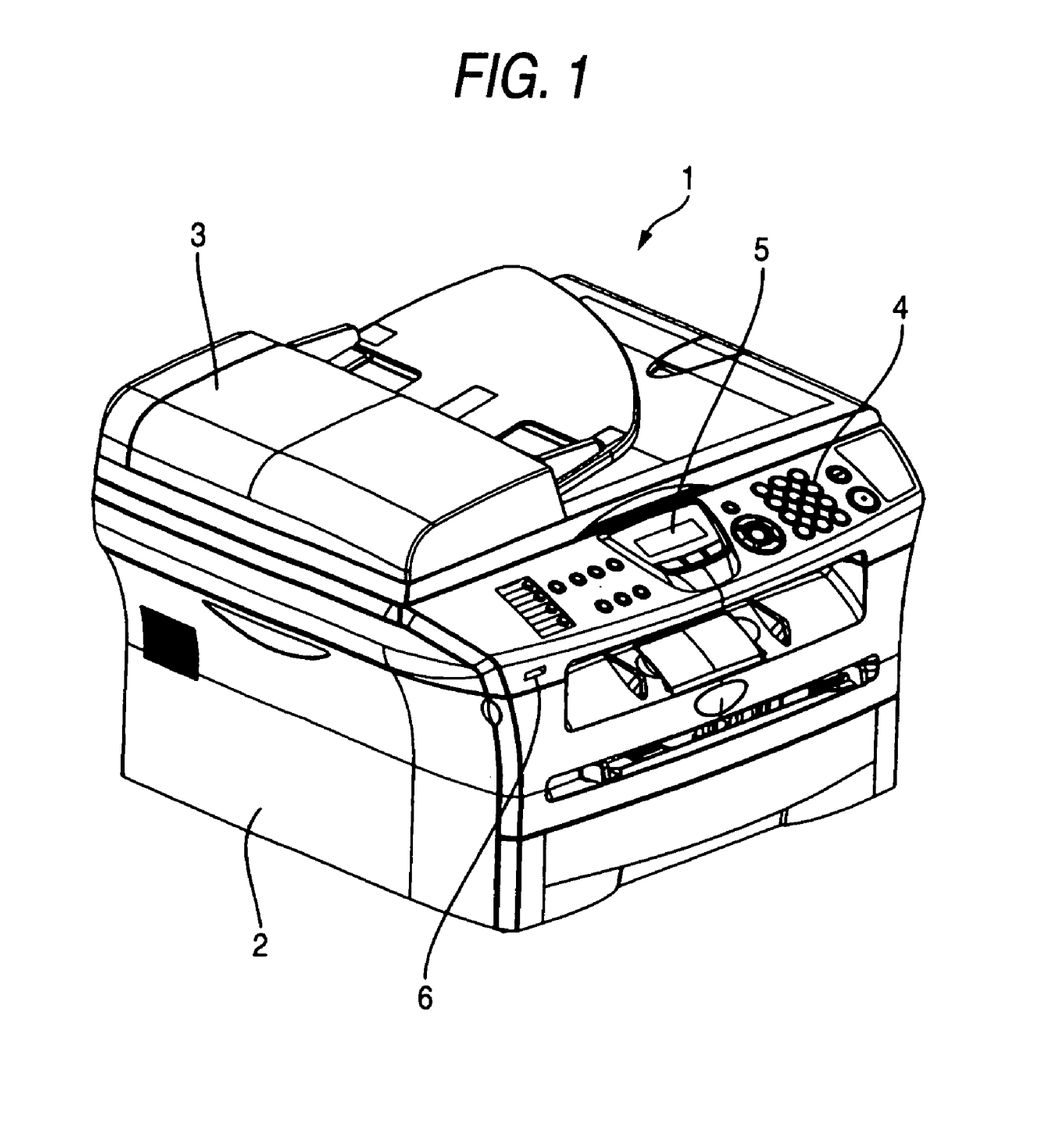
FIG. 1 is a perspective view illustrating the exterior configuration of a multi function device according to an exemplary embodiment of the invention.

FIG. 1 is a perspective view illustrating a multi function device 1. The multi function device 1 is a multi function peripheral device having a printer function, a scanner function, a copy function, a facsimile function, and the like.

As shown in FIG. 1, the multi function device 1 includes a reading unit 3 that is provided upward of a main body portion 2 to read an original. At the front part of the reading unit 3, there is provided an operation unit 4 which has a plurality of buttons and on which a user performs various input operations, a display unit 5 having a liquid crystal display or the like, and a USB connector 6.

(Electrical Configuration of Multi Function Device)

Figure 2:
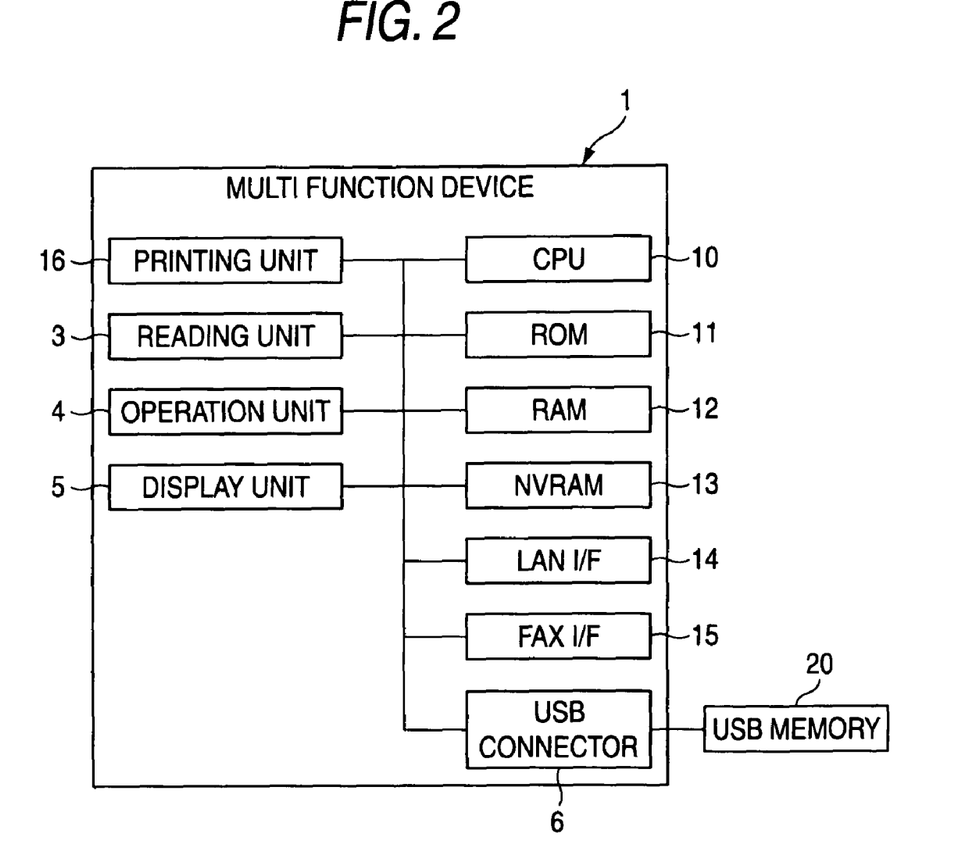
FIG. 2 is a block diagram schematically illustrating the electrical configuration of the multi function device.

FIG. 2 is a block diagram schematically illustrating the electrical configuration of the multi function device 1. As shown in the drawing, the multi function device 1 includes a central processing unit (CPU) 10, a ROM 11, a RAM 12, an NVRAM 13 which is a nonvolatile memory, a network interface 14, a facsimile interface 15, and the USB connector 6 described above. To the above components, a printing unit 16, the reading unit 3, the operation unit 4, the display unit 5 described above, and the like are coupled.

The ROM 11 stores various programs for controlling the operation of the multi function device 1. The CPU 10 controls each component or unit according to the programs read out from the ROM 11 while storing the processing results in the RAM 12 or the NVRAM 13.

The network interface 14 is coupled to an external computer or the like through a communication line (not shown). The network interface 14 enables mutual data communication. The facsimile interface 15 is coupled to a telephone line (not shown). The facsimile interface 15 enables communication of facsimile data with an external facsimile device. A USB memory 20 or the like is detachably coupled to the USB connector 6. The printing unit 16 forms an image on a recording medium, such as a sheet or the like, on the basis of print data.

(Trial Printing Function Setup Processing)

Figure 3:
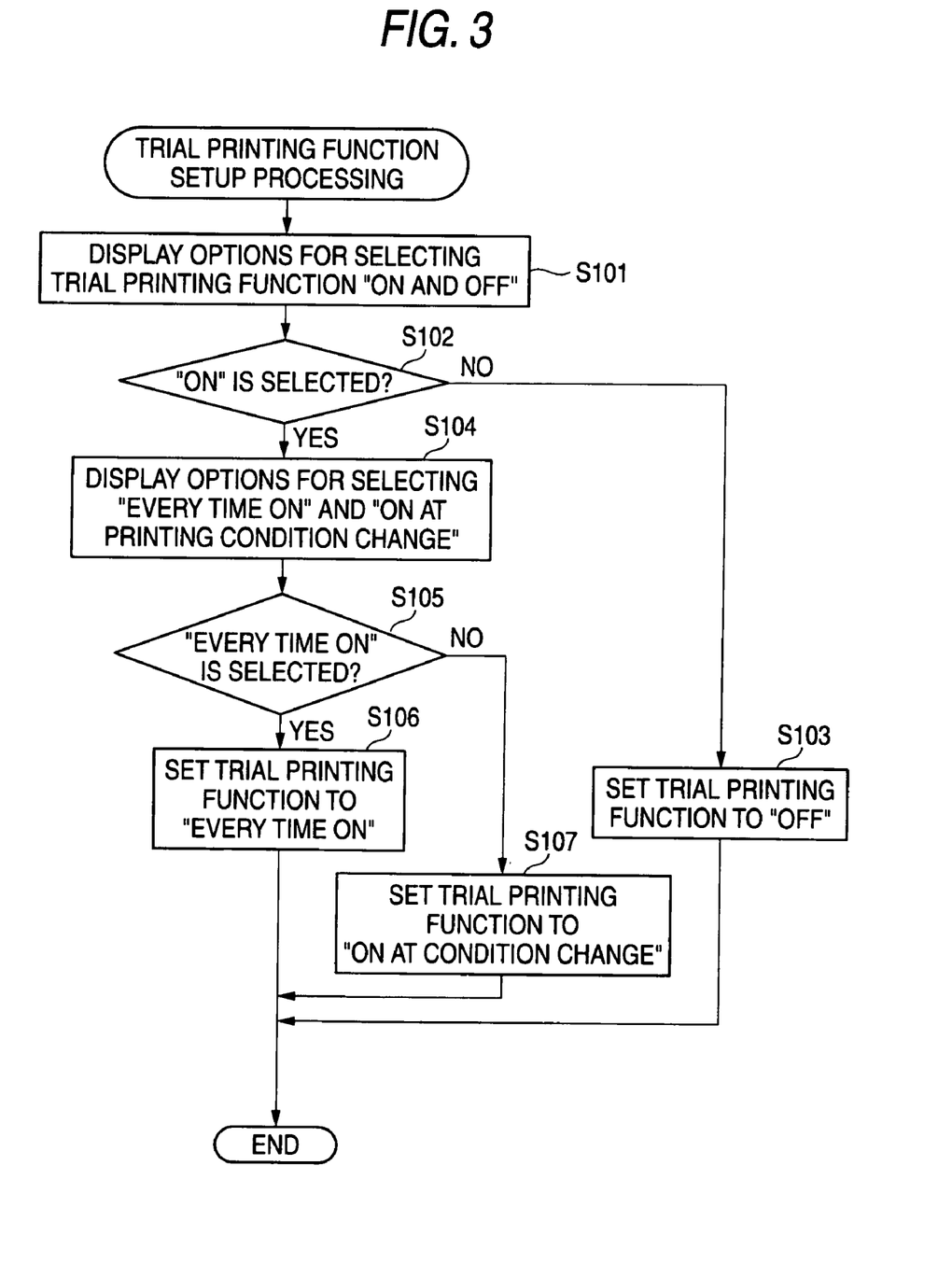
FIG. 3 is a flowchart illustrating the flow of a trial printing function setup processing.

The multi function device 1 executes a direct printing processing to print files stored in the USB memory 20 without using an information terminal device such as a computer (PC) or the like. Further, as described below, the multi function device 1 has a trial printing function to print a part of pages included in a print job during direct printing. Next, a trial printing function setup processing which is executed to set an operation state of the trial printing function during direct printing will be described. FIG. 3 is a flowchart illustrating the flow of the trial printing function setup processing.

The trial printing function setup processing is started when the user inputs a predetermined instruction through the operation unit 4. If the trial printing function setup processing starts, the CPU 10 first controls the display unit 5 to display a screen for selection between ON and OFF of the trial printing function (S101). If the user selects "OFF" through the operation unit 4 (S102: No), the trial printing function is set to "OFF" (S103). Specifically, a set value is stored in the NVRAM 13, and hereinafter the same is applied.

If "ON" is selected (S102: Yes), options for selecting one of "IF PRINTING CONDITION IS CHANGED FROM DEFAULT, TRIAL PRINTING FUNCTION IS ON" and "TRIAL PRINTING FUNCTION IS EVERY TIME ON" are displayed on the display unit 5 (S104). Then, if the user selects "TRIAL PRINTING FUNCTION IS EVERY TIME ON" (S105: Yes), the trial printing function is set to "EVERY TIME ON" (S106). If "TRIAL PRINTING FUNCTION IS EVERY TIME ON" is not selected (S105: No), the trial printing function is set to "ON AT CONDITION CHANGE" (S107).

(Direct Printing Processing)

Figure 4:
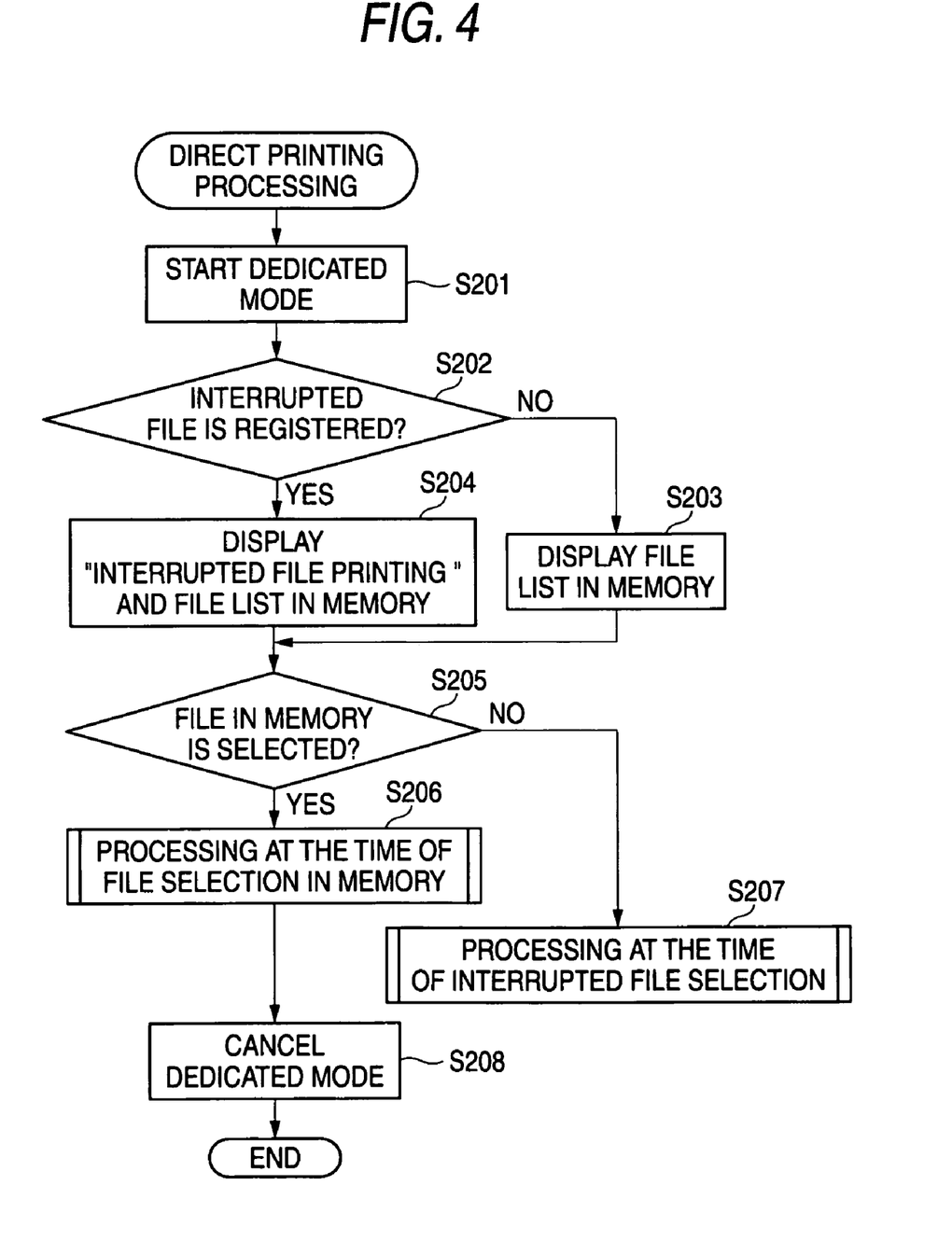
FIG. 4 is a flowchart illustrating the flow of a direct printing processing.
Figure 5:
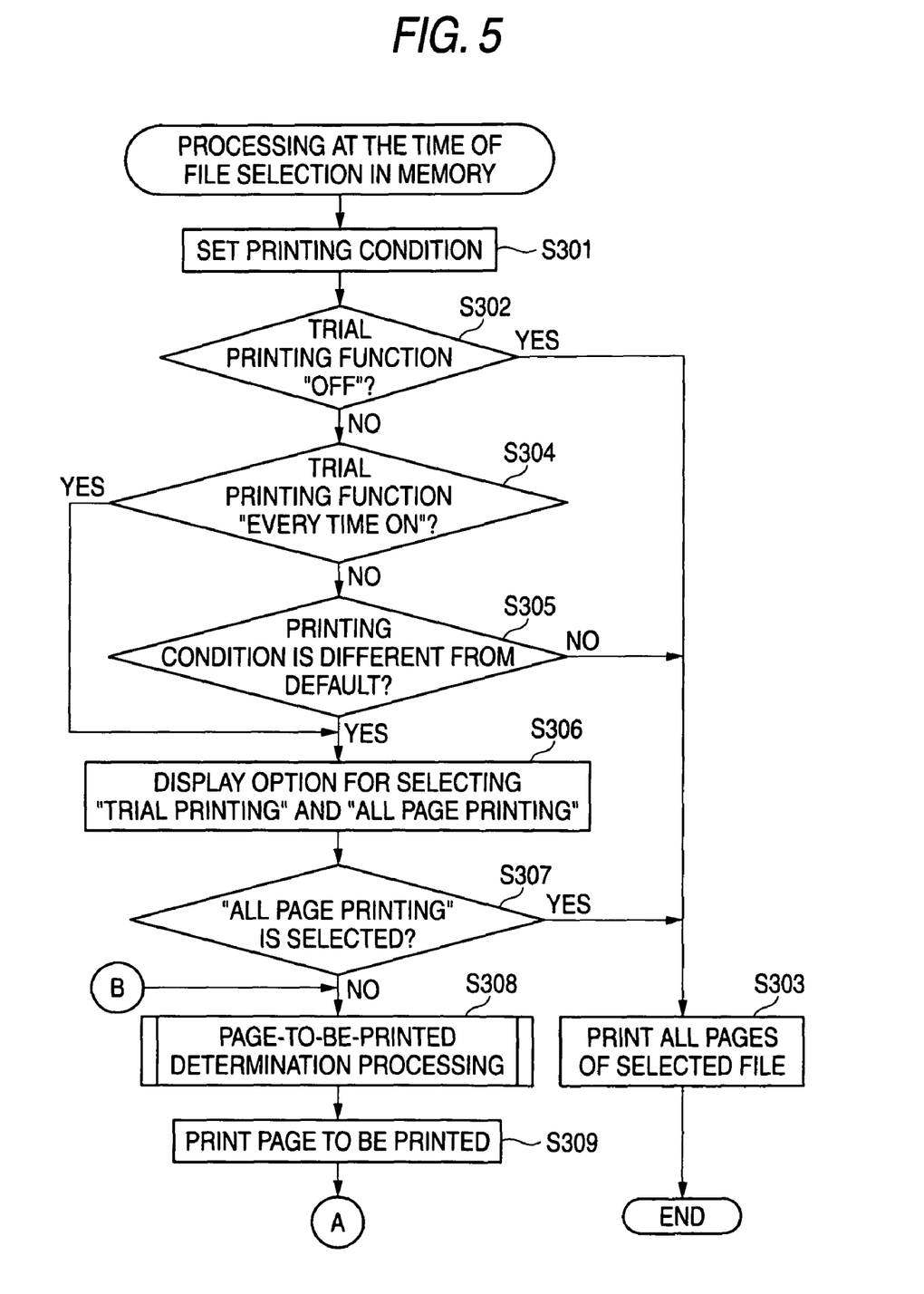
FIG. 5 is a flowchart illustrating the flow of a processing at the time of file selection in memory.
Figure 6:
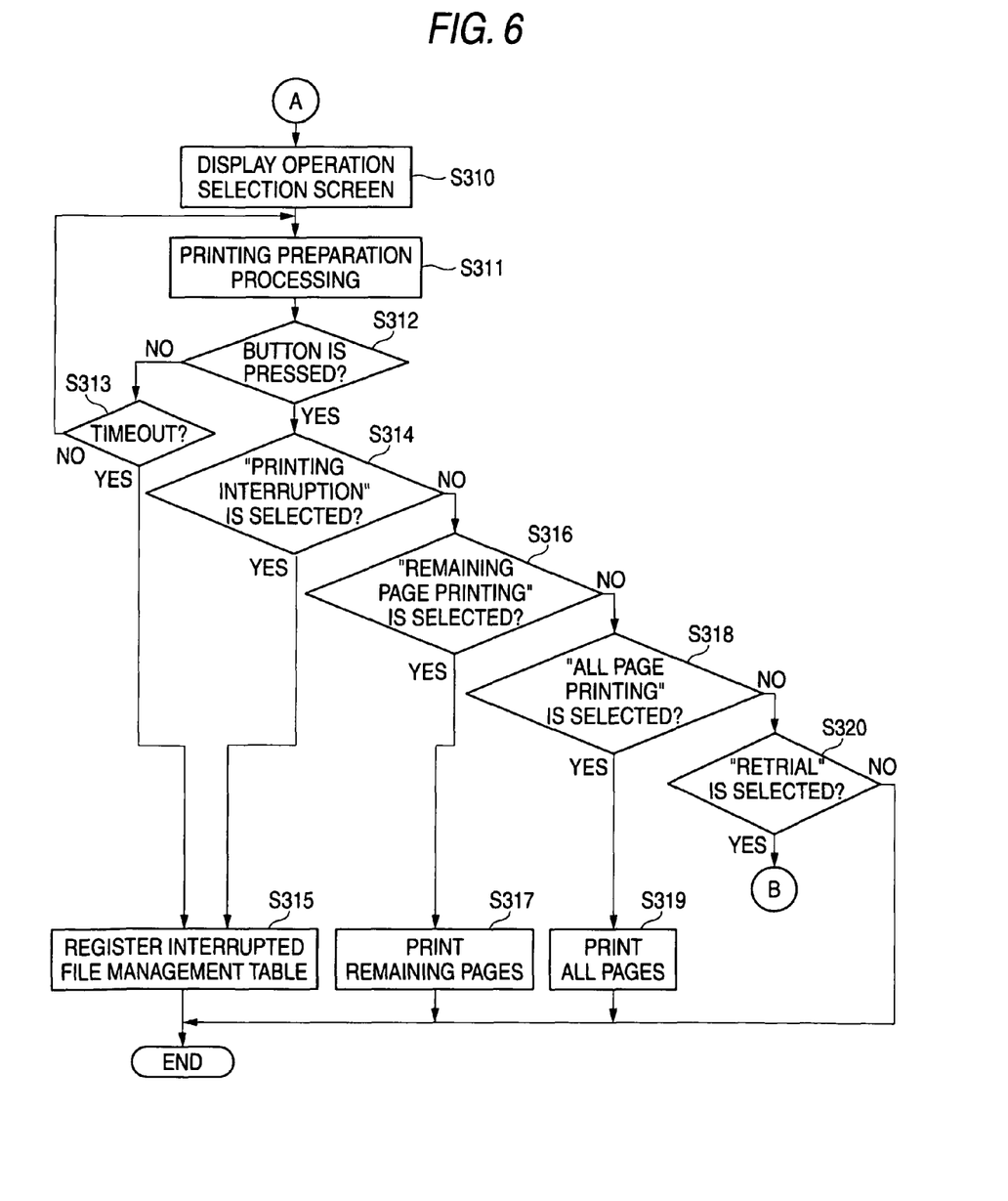
FIG. 6 is a flowchart illustrating the flow of a processing at the time of file selection in memory.
Figure 7:
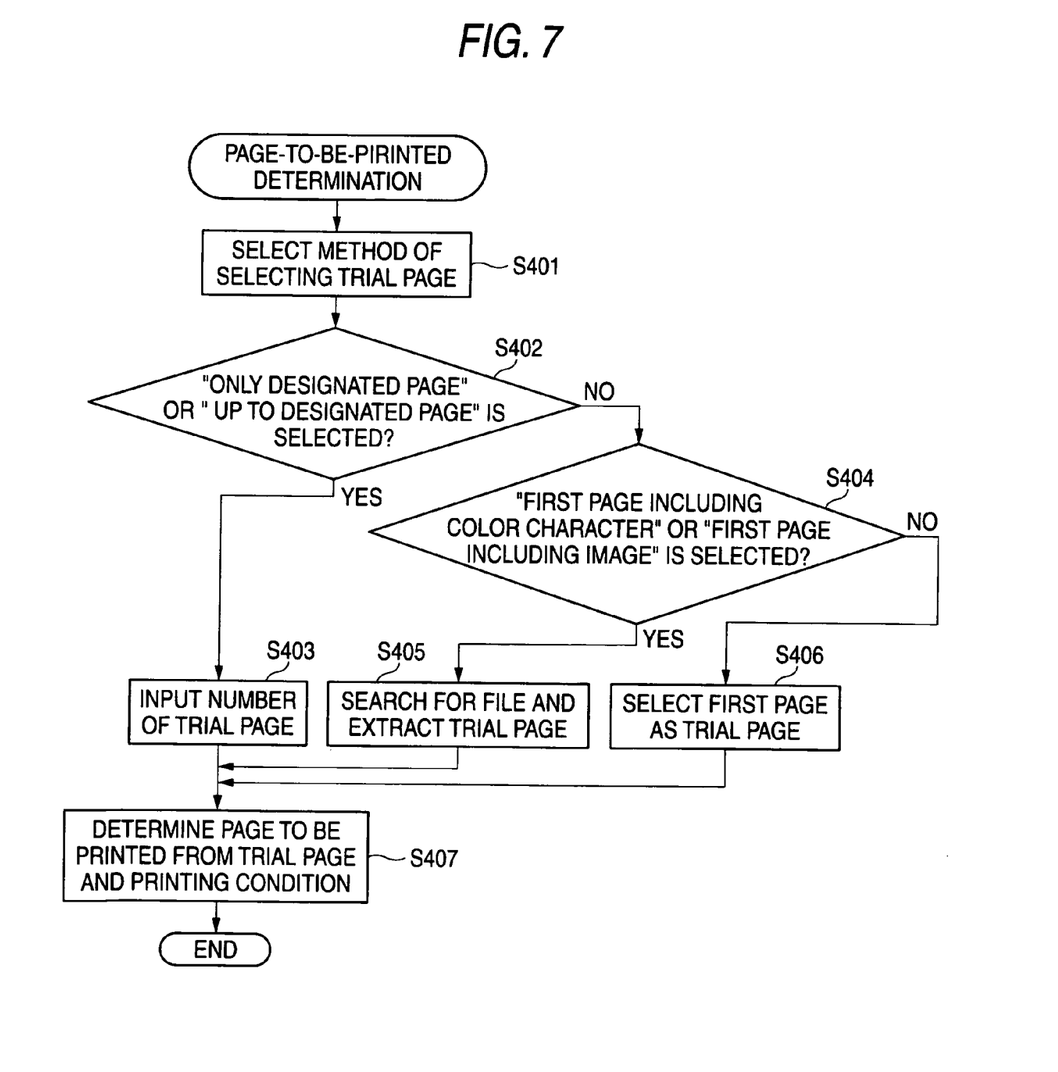
FIG. 7 is a flowchart illustrating the flow of a page-to-be-printed determination processing.
Figure 8:
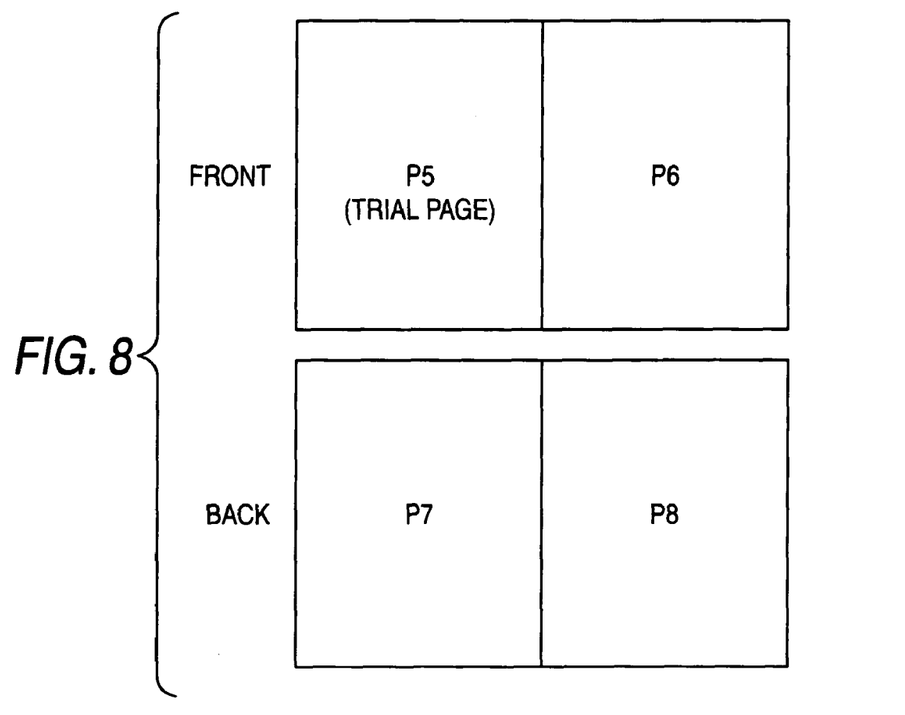
FIG. 8 is a diagram illustrating an example in which trial printing is executed.
Figure 9:
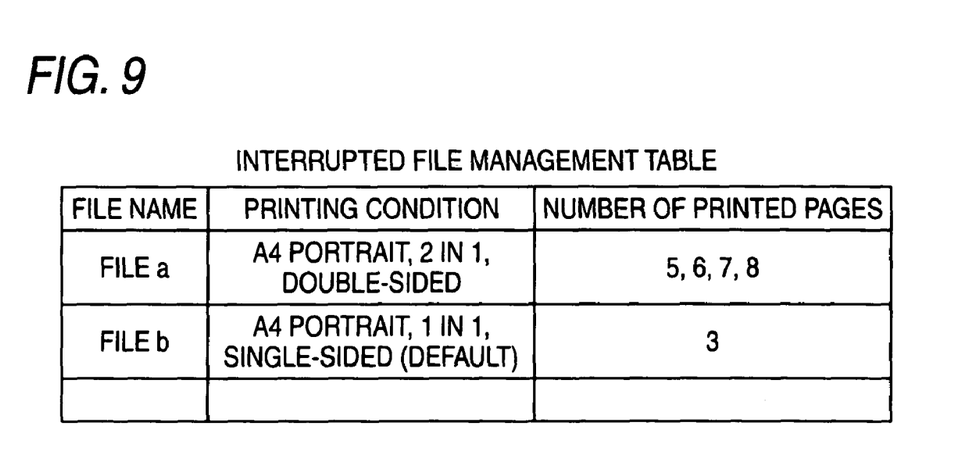
FIG. 9 is a diagram illustrating an example of an interrupted file management table.
Figure 10:
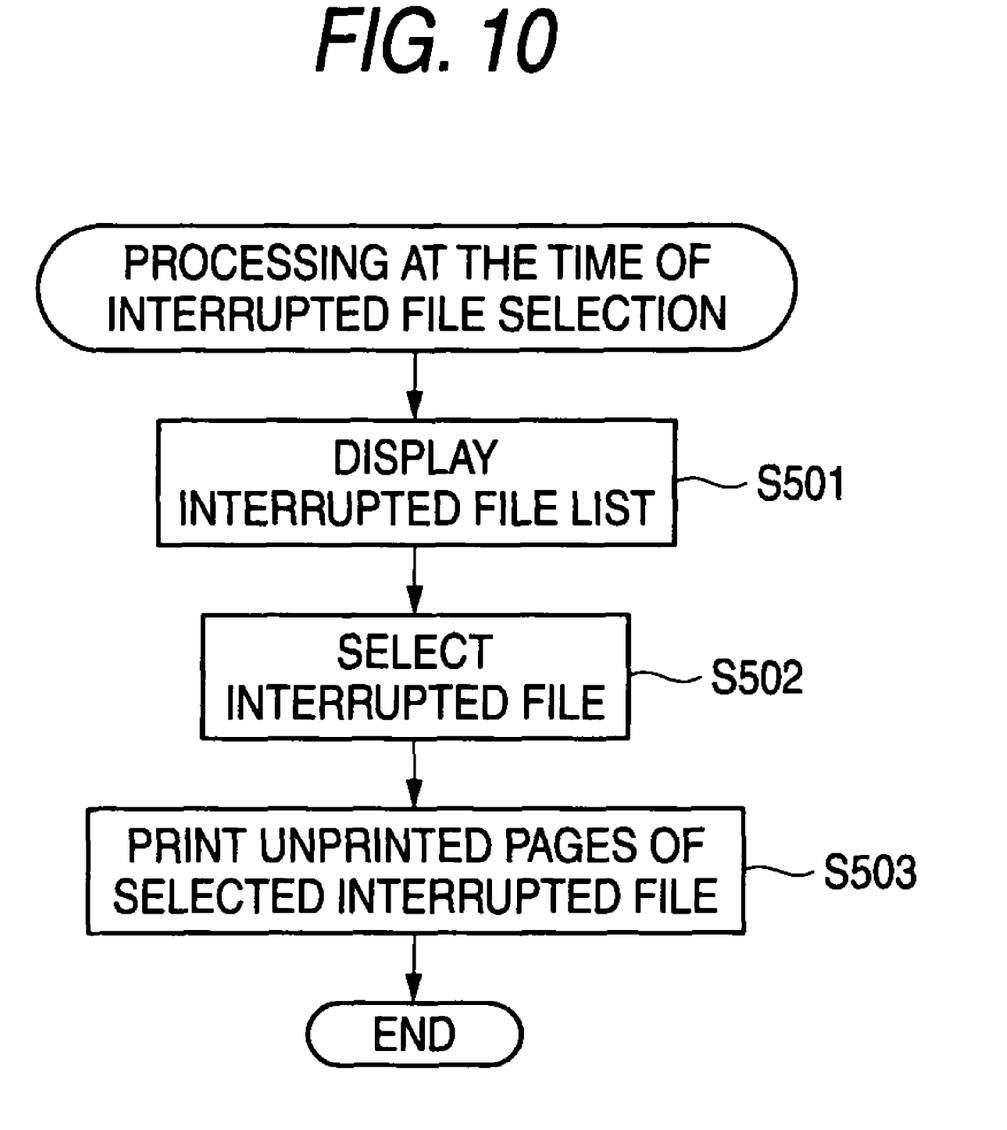
FIG. 10 is a flowchart illustrating the flow of a processing at the time of interrupted file selection.

FIG. 4 is a flowchart illustrating the flow of the direct printing processing. FIGS. 5 and 6 are flowcharts illustrating the flow of a processing at the time of file selection in a memory, which is executed during the direct printing processing. FIG. 7 is a flowchart illustrating the flow of a page-to-be-printed determination processing which is executed during the processing at the time of file selection in a memory. FIG. 8 is a diagram illustrating an example in which trial printing is executed. FIG. 9 is a diagram illustrating an example of an interrupted file management table. FIG. 10 is a flowchart illustrating the flow of a processing at the time of interrupted file selection, which is executed during the direct printing processing.

The direct printing processing is started when the user mounts the USB memory 20 or the like on the USB connector 6, and inputs an instruction to execute direct printing through the operation unit 4. If the direct printing processing starts, as shown in FIG. 4, the CPU 10 first starts a dedicated mode (S201). During the dedicated mode, no job, which is a print job such as copy or direct printing, or a job such as scanning or facsimile transmission, is accepted from the operation unit 4. In addition, during the dedicated mode, if a print job or a job such as facsimile transmission is input from an external computer through the network interface 14, the job is not immediately executed and is registered in a queue. Then, after the dedicated mode is cancelled, the job registered in the queue is executed.

The CPU 10 determines whether an interrupted file (described below) is registered in an interrupted file management table which is stored in the RAM 12 (S202). If no interrupted file is registered (S202: No), the CPU 10 controls the display unit 5 to display a list of files stored in the USB memory 20 (S203).

If an interrupted file is registered (S202: Yes), the interrupted file is added into the file list of the USB memory 20, and an item for instructing "INTERRUPTED FILE PRINTING" is displayed as an option (S204). In S203 or S204, if one file in the file list is selected by an input from the operation unit 4 (S205: Yes), a processing at the time of file selection in memory described below is executed (S206). In S205, when "INTERRUPTED FILE PRINTING" is selected (S205: No), a processing at the time of interrupted file selection described below is executed (S207).

If the processing at the time of file selection in memory shown in FIGS. 5 and 6 is started, the CPU 10 first controls the display unit 5 to display a printing condition setting screen (S301). On the printing condition setting screen, the user can set various printing conditions, such as a sheet size, combined printing or double-sided printing, and the like, by using the operation unit 4. Specifically, as for setting the sheet size, one of the options "A4 PORTRAIT", "A4 LANDSCAPE", "A3 PORTRAIT", and the like can be selected. As for setting the combined printing, one of the options "1 in 1 (one page is printed on a side of one sheet. That is, combined printing is not performed)", "2 in 1", "4 in 1", and the like can be selected. In addition, as for setting the double-sided printing, one of "ON" and "OFF" can be selected.

As for the printing conditions, initial values (default) are set, for example, the sheet size "A4 PORTRAIT", combined printing "1 in 1", and double-sided printing of "OFF". If the values do not need to be changed, they can be set unchanged. If setting completion is input from the operation unit 4, a file selected from the above-described file list is determined as a printing target, and a print command to instruct printing based on the set printing conditions, that is, a print job is registered (input).

Subsequently, it is determined whether the trial printing function is set to "OFF" (S302). If the trial printing function is set to "OFF" in S103 (S302: Yes), an image processing is executed for all pages of the file selected as the printing target, generated print data is transmitted to the printing unit 16, and printing of all of the pages included in the print job is executed (S303). Thereafter, the process exits from the processing at the time of file selection in memory. And, the dedicated mode is cancelled (S208 in FIG. 4) and subsequently the direct printing processing ends. Accordingly, the multi function device 1 can process another job, such as a print job or the like.

In S302 of FIG. 5, if it is determined that the trial printing function is set to be other than "OFF" (S302: No), it is determined whether the trial printing function is set to "EVERY TIME ON" in S106 (S304). If "ON AT CONDITION CHANGE" is set in S107 (S304: No), it is determined whether the printing condition is changed from the default (S305). Then, if the printing condition is not changed from the default (S305: No), the process proceeds to S303, and printing of all the pages included in the print job is executed.

In S305, if it is determined that the printing condition is changed from the default (S305: Yes), or in S304, if it is determined that the trial printing function is set to "EVERY TIME ON" in S106 (S304: Yes), the CPU 10 controls the display unit 5 to display two options of "TRIAL PRINTING" and "ALL PAGE PRINTING" (S306). Then, if "ALL PAGE PRINTING" is selected through the operation unit 4 (S307: Yes), the process proceeds to S303, and all the pages included in the print job are printed. When "TRIAL PRINTING" is selected (S307: No), a page-to-be-printed determination processing described below is executed (S308). It is noted that S306 and S307 (option "ALL PAGE PRINTING" display) may be omitted, and if the printing condition is changed from the default in S305 (S305: Yes) or if the trial printing function is set to "EVERY TIME ON" in S304 (S304: Yes), S308 and later (trial printing processing) may be executed every time.

If the page-to-be-printed determination processing of S308 is started, as shown in FIG. 7, the CPU 10 first controls the display unit 5 to display a screen for selecting a method of selecting a page (trial page) which is printed as trial (S401). Here, for example, options for selecting one of "ONLY DESIGNATED PAGE", "UP TO DESIGNATED PAGE", "FRONT PAGE", "FIRST PAGE INCLUDING COLOR CHARACTER", "FIRST PAGE INCLUDING IMAGE", and the like is displayed. Then, the user can select one of these items by means of the operation unit 4.

If "ONLY DESIGNATED PAGE" or "UP TO DESIGNATED PAGE" is selected (S402: Yes), the CPU 10 controls the display unit 5 to display a screen on which the user inputs the number of a page to be designated as a trial page, and acquires the page number input from the operation unit 4 by the user (S403). Then, when "ONLY DESIGNATED PAGE" is selected, from among the pages included in the print job, the page corresponding to the input number is designated as a trial page. When "UP TO DESIGNATED PAGE" is selected, pages from the front page to the page corresponding to the input number are selected as the trial page.

In S401, if "FIRST PAGE INCLUDING COLOR CHARACTER" or "FIRST PAGE INCLUDING IMAGE" is selected (S404: Yes), the contents of a file to be printed is searched, and from among the pages included in the print job, a page satisfying corresponding condition is extracted as the trial page (S405). When no page satisfying the condition is found, for example, the first page is selected as the trial page. In S401, if "FRONT PAGE" is selected (S404: No), the first page is selected from among the pages included in the print job as the trial page (S406).

Next, the CPU 10 determines a page to be printed when the trial page is printed (S407). In the print job in process, if the printing condition is combined printing or double-sided printing, and if a page other than the trial page is to be printed on a sheet same as a page which is selected as the trial page, the corresponding page is to be printed together with the trial page. Furthermore, in the print job, if the printing condition is neither combined printing nor double-sided printing (that is, if one page is printed on one sheet), or if no page other than the trial page is printed on the sheet same as a page which is selected as the trial page, only the trial page is to be printed.

For example, as shown in FIG. 8, if the fifth page in the print job is selected as the trial page, if combined printing "2 in 1" and double-sided printing "ON" are set as the printing condition, the sixth, seventh, and eighth pages are to be printed on the same sheet together with the fifth page.

Then, the CPU 10 performs an image processing on the basis of the page determined as the page to be printed in such a manner, and transmits the generated print data to the printing unit 16 to thereby perform printing (S309 in FIG. 5). Accordingly, the pages to be printed including the trial page are printed on the sheet according to the printing conditions. Therefore, the user can view the printed page and determine whether a file to be printed is correctly selected or whether the printing conditions are appropriately set. It is noted that the page-to-be-printed determination processing may be more simplified. That is, a condition for determining the trial page may be set in advance and the page-to-be printed may be automatically determined based on the condition.

Subsequently, the CPU 10 controls the display unit 5 to display options for instructing a next operation, such as "PRINTING INTERRUPTION", "REMAINING PAGE PRINTING", "ALL PAGE PRINTING", "RETRIAL", "END", and the like (S310), and performs a printing preparation processing (S311). During this processing, an image processing is performed to generate print data on the basis of unprinted pages included in the print job, and after a predetermined period elapses, it is determined whether a button of the operation unit 4 is pressed (S312).

Then, if no input is given from the operation unit 4 (S312: No), it is determined whether a predetermined timeout period elapses (S313). If the timeout period does not elapse (S313: No), the process proceeds to S311, and the image processing is continued. After the predetermined period elapses, in S312, it is again determined whether a button of the operation unit 4 is pressed.

When the timeout period elapses in a state where no button of the operation unit 4 is pressed (S313: Yes), or in S310, when "PRINTING INTERRUPTION" is selected (S314: Yes), the image processing is interrupted, and information of the print job in process is registered in the interrupted file management table. The interrupted file management table is stored in the RAM 12. As shown in FIG. 9, the name of a file to be printed (referred to as interrupted file), the set values of the printing conditions, and the numbers of printed pages are registered in the interrupted file management table. Thereafter, the process exits from the processing at the time of file selection in memory and proceeds to S208 in FIG. 4. Then, the dedicated mode is cancelled, and the direct printing processing ends.

If "REMAINING PAGE PRINTING" is selected on the operation selection screen in S310 (S316: Yes), pages excluding the printed pages among the pages included in the print job are printed (S317). In this case, the previously printed pages and the subsequently printed pages are put together, thereby obtaining all pages.

If "ALL PAGE PRINTING" is selected on the operation selection screen in S310 (S318: Yes), all pages included in the print job including the previously printed pages are printed (S319). In this case, all the pages of the original file are output while the page sequence of the file is unchanged.

If "RETRIAL" is selected on the operation selection screen in S310 (S320: Yes), the process returns to S308, and the page-to-be-printed determination processing is executed again (see FIG. 7). Accordingly, when the user cannot determine whether a file to be printed is correctly selected even if the user views the page printed as the trial page, another page can be selected as the trial page by selecting "RETRIAL".

If "END" is selected on the operation selection screen in S310 (S320: No), or if printing ends in S317 and S319, the process exits from the file selection processing. Then, in S209 of FIG. 4, the dedicated mode is cancelled, and the direct printing processing ends.

As described above, in FIG. 4, if an interrupted file is registered in the interrupted file management table (S202: Yes), the interrupted file is added into the file list of the USB memory 20, and the item "INTERRUPTED FILE PRINTING" is displayed (S204). If "INTERRUPTED FILE PRINTING" is selected (S205: No), a processing at the time of interrupted file selection described below is executed (S207).

If the processing at the time of interrupted file selection is started, as shown in FIG. 10, the CPU 10 first controls the display unit 5 to display a list of interrupted files registered in the interrupted file management table (S501). If the user selects one interrupted file from the list by means of the operation unit 4 (S502), on the basis of information in the interrupted file management table, the selected interrupted file is set as a file to be printed, and unprinted pages are printed according to the set printing condition (S503). Here, it may be configured such that the user instructs printing of all pages of the interrupted file, not the unprinted pages.

ADVANTAGE OF EXEMPLARY EMBODIMENTS

According to the above-described exemplary embodiments, a part of a print job including a plurality of pages is printed as a trial page, and thereafter, when it is instructed to continue the print job, the print job is restarted and finished (completed). Therefore, the user can view the printed page to confirm the printed contents, and based on the confirmation result, can determine whether to continue or interrupt the print job. As a result, it is possible to suppress ink, developer, or sheet consumption due to misprinting (for example, a file to be printed is erroneously selected or printing setting is erroneously input).

One page is printed for one print job as the trial page. Therefore, when misprinting occurs, ink or sheet consumption can be suppressed to the minimum.

A page, which satisfies an extraction condition, is extracted from among a plurality of pages included in a print job, and then printed as the trial page. Therefore, a page which enables the user to easily confirm the file contents is extracted, such that it is possible to make it easy for the user to find a page for confirming the contents.

A page to be printed as the trial page can be designated. Therefore, it is convenient, for example, when the user views a specific page to easily grasp the contents of the printed file.

When it is instructed to continue a print job, all pages excluding the printed pages among pages included in the print job are printed. Therefore, wasteful ink or sheet consumption may be eliminated.

During a period from when the trial page is printed until an instruction is given from the operation unit 4, an image processing is executed. Therefore, when it is instructed to continue the print job, a time required to complete printing can be reduced.

When the user cannot sufficiently confirm the contents with a page printed as the trial page, another page can be printed as a trial page. Thus, usability is enhanced. In addition, ink or sheet consumption can be suppressed, as compared with a case where multiple pages are printed at a time as trial pages.

When no instruction is given for any reason after the trial page is printed, the print job is interrupted and the dedicated mode is cancelled. Therefore, it is possible to prevent the user's print job from affecting another user's operation.

When it is not necessary to print a trial page, it is convenient for the user since the trial printing can be set not to be executed.

When the printing setting is changed from the initial value (default), it may be further necessary to confirm the printed contents, and only in such a case, the trial printing is executed. Thus, usability is enhanced.

When combined printing or double-sided printing is executed, a page, which is to be printed on a recording medium with having printed a page being used as the trial page in the print job, is printed together with the trial page. Therefore, a printed matter printed as the trial page is the same as that printed in the print job.

When the print job is interrupted after the trial page is printed, information indicative of which pages are printed among the pages included in the print job is registered as an interrupted file management table. Therefore, for example, when the print job is interrupted, only unprinted pages can be printed later with reference to the information in the interrupted file management table.

Among the pages included in the interrupted print job, pages excluding the printed pages can be printed with reference to the interrupted file management table. Therefore, for example, some pages from a plurality of files are printed, and it is convenient for the user to print unprinted pages of a necessary file later. As a result, wastefulness can be eliminated, as compared with a case where all pages are printed from the beginning.

A file to be printed can be selected from among files stored in the USB memory 20. In general, a portable storage medium, such as the USB memory 20 or the like, is not always coupled to a computer or the like, and thus it is difficult to confirm the contents of files stored therein. Then, there is a comparatively high possibility that misprinting occurs. Therefore, the effect of applying the invention is high.

If the invention is applied to a case where a file (for example, PDF, TIFF, and DOC files) including a plurality of pages such as a document file or the like is printed, it is possible to effectively suppress wasteful consumption due to misprinting.

OTHER EXEMPLARY EMBODIMENTS

While the present invention has been shown and described with reference to certain exemplary embodiments thereof, it will be understood by those skilled in the art that various changes in form and details may be made therein without departing from the spirit and scope of the invention as defined by the appended claims.

(1) In the above-described exemplary embodiment, the files stored in the USB memory are the target of printing. Alternatively, files stored in a memory card or a portable hard disk drive being used as a portable storage medium may be the target of printing. In addition, files stored in a hard disk drive, which is embedded in an external information processing device and coupled though a network interface or the like, may be the target of printing.

(2) Multiple copy printing may be set as a printing condition in a print job during direct printing. If multiple copy printing is executed, for example, a first copy may be printed as a trial page, and thereafter, when it is instructed to continue printing, remaining copies may be printed.

(3) In the above-described exemplary embodiment, one file is selected as the target of printing. Alternatively, a folder stored in the USB memory or the like may be selected as the target of printing. In this case, all files such as image files stored in the selected folder is to be printed and a part of files may be printed as trial.

The present invention provides illustrative, non-limiting embodiments as follows:

(1) An image forming apparatus includes: a selection section which selects a print target to be printed; an input section which inputs a print job for printing the print target selected by the selection section; an instruction section which instructs to continue the print job; and a printing section which executes a trial printing of printing a part of the print job including a plurality of pages input by the input section as a trial page, and thereafter, restarting and finishing the print job in response to that the instruction section instructs to continue the print job.

(2) In the image forming apparatus according to (1), the printing section may print one page for one print job as the trial page.

(3) The image forming apparatus according to (1) or (2), may further include: an extraction section which extracts a page, which satisfies a predetermined extraction condition, from among the plurality of pages included in the print job. The printing section may print at least a part of the pages extracted by the extraction section as the trial page.

(4) The image forming apparatus according to (1) or (2), may further include: a designation section which designates a page to be printed as the trial page.

(5) In the image forming apparatus according to any one of (1) to (4), in response to that the instruction section instructs to continue the print job, the printing section may print all of the pages included in the print job, other than the trial page which has been already printed.

(6) The image forming apparatus according to any one of (1) to (5), may further include: an image processing section which executes an image processing of generating print data which is to be provided to the printing section from the print target, based on the print job. The image processing section executes the image processing based on the print job during a time period from when the trial page included in the print job is printed by the printing section to when an instruction is given from the instruction section.

(7) The image forming apparatus according to any one of (1) to (6), may further include: a changing section which changes the trial page. If the trial page is changed by the changing section after the trial page is printed, the printing section may print another page included in the print job as the trial page.

(8) In the image forming apparatus according to any one of (1) to (7), when executing the trial printing for one print job, the printing section may operate with a dedicated mode in which no other print jobs are processed and may cancel the dedicated mode if no instruction is given from the instruction section for a predetermined time period.

(9) The image forming apparatus according to any one of (1) to (8), may further include: a setting section which sets whether to execute the trial printing. When the print jot is input by the input section, the printing section may process the print job without printing the trial page if the setting section sets not to execute the trial printing.

(10) In the image forming apparatus according to (9), the setting section may set to execute the trial printing if a printing condition of the print job is changed from an initial condition, and may set not to execute the trial printing if the printing condition of the print job is not changed from the initial condition.

(11) In the image forming apparatus according to any one of (1) to (10), if a printing condition of the print job includes at least one of combined printing and double-sided printing, the printing section may print a page, which is to be printed on a recording medium same as the trial page in the print job, together with the trial page in the trial printing.

(12) The image forming apparatus according to any one of (1) to (11), may further include: a storage section which, if the printing section interrupts to process the print job after printing the trial page, stores print interruption information indicative of which pages have been printed among the pages included in the print job.

(13) In the image forming apparatus according to (12), the printing section may print pages other than the page, which has been printed, among the pages included in the interrupted print job with reference to the print interruption information.

(14) The image forming apparatus according to any one of (1) to (13), may further include a connection section that is detachably connected to a portable storage medium. The selection section may select the print target from among data stored in the portable storage medium.

(15) In the image forming apparatus according to any one of (1) to (14), the printing section may process a print job of printing the print target including a plurality of pages.

(16) In the image forming apparatus according to any one of (1) to (15), the selection section may select a file as the print target.

(17) The image forming apparatus according to any one of (1) to (15), the selection section may select a folder as the print target, and the input section may input the print job for printing files stored in the folder selected by the selection section.

What is claimed is:

1. An image forming apparatus comprising:
a selection section which selects a print target to be printed;
an input section which inputs a print job comprising instructions for printing the print target selected by the selection section;
an instruction section which instructs to continue the print job;
a printing section which executes a trial printing of printing a part of the print job including a plurality of pages input by the input section as a trial page, and thereafter, restarting and finishing the print job in response to that the instruction section instructs to continue the print job; and
an extraction section which extracts a page, which satisfies a predetermined extraction condition, from among the plurality of pages included in the print job,
wherein the printing section prints at least a part of the page extracted by the extraction section as the trial page,
wherein the extraction section extracts a page having the extraction condition selected from the group consisting of: a page comprising a color character and a page comprising an image, as the pare that satisfies the predetermined extraction condition, and
wherein, when the print job does not include a page satisfying the predetermined extraction condition, the extraction section extracts a first page of the print job as the trial page.

2. The image forming apparatus according to claim 1, wherein, in response to that the instruction section instructs to continue the print job, the printing section prints all of the pages included in the print job, other than the trial page which has been already printed.

3. The image forming apparatus according to claim 1, further comprising:
an image processing section which executes an image processing of generating print data which is to be provided to the printing section from the print target, based on the print job,
wherein the image processing section executes the image processing based on the print job during a time period from when the trial page included in the print job is printed by the printing section to when an instruction is given from the instruction section.

4. The image forming apparatus according to claim 1, further comprising:
a changing section which changes the trial page,
wherein, if the trial page is changed by the changing section after the trial page is printed, the printing section prints another page included in the print job as the trial page.

5. The image forming apparatus according to claim 1, wherein, when executing the trial printing for one print job, the printing section operates with a dedicated mode in which no other print jobs are processed and cancels the dedicated mode if no instruction is given from the instruction section for a predetermined time period.

6. The image forming apparatus according to claim 1, further comprising:
a setting section which sets whether to execute the trial printing,
wherein, when the print job is input by the input section, the printing section processes the print job without printing the trial page if the setting section sets not to execute the trial printing.

7. The image forming apparatus according to claim 6, wherein the setting section sets to execute the trial printing if a printing condition of the print job is changed from an initial condition, and sets not to execute the trial printing if the printing condition of the print job is not changed from the initial condition.

8. The image forming apparatus according to claim 1, wherein, if a printing condition of the print job includes at least one of combined printing and double-sided printing, the printing section prints a page, which is to be printed on a recording medium same as the trial page in the print job, together with the trial page in the trial printing.

9. The image forming apparatus according to claim 1, further comprising:
a storage section which, if the printing section interrupts to process the print job after printing the trial page, stores print interruption information indicative of which pages have been printed among the pages included in the print job.

10. The image forming apparatus according to claim 9, wherein the printing section prints pages other than the page, which has been printed, among the pages included in the interrupted print job with reference to the print interruption information.

11. The image forming apparatus according to claim 1, further comprising:
a connection section that is detachably connected to a portable storage medium,
wherein the selection section selects the print target from among data stored in the portable storage medium.

12. The image forming apparatus according to claim 1, wherein the printing section processes a print job of printing the print target including a plurality of pages.

13. The image forming apparatus according to claim 1, wherein the selection section selects a file as the print target.

14. The image forming apparatus according to claim 1, wherein the selection section selects a folder as the print target, and wherein the input section inputs the print job for printing files stored in the folder selected by the selection section.

15. The image forming apparatus according to claim 1, wherein the extraction section extracts a page comprising a color character as the page that satisfies the predetermined extraction condition.

16. The image forming apparatus according to claim 1, wherein the extraction section extracts a page comprising an image as the page that satisfies the predetermined extraction condition.

* * * * *